(12) United States Patent
Jahnke et al.

(10) Patent No.: US 7,060,382 B2
(45) Date of Patent: Jun. 13, 2006

(54) FUEL CELL SYSTEM WITH RECYCLE OF ANODE EXHAUST GAS

(75) Inventors: Fred C. Jahnke, Rye, NY (US); Sanjay C. Parab, West Hartford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 10/439,132

(22) Filed: May 15, 2003

(65) Prior Publication Data

US 2004/0229102 A1 Nov. 18, 2004

(51) Int. Cl.
*H01M 8/04* (2006.01)

(52) U.S. Cl. .......................................... 429/34; 429/26

(58) Field of Classification Search .................. 429/17, 429/19, 20, 26, 34, 38, 39
See application file for complete search history.

(56) References Cited

U.S. PATENT DOCUMENTS

| | | | |
|---|---|---|---|
| 3,527,618 A | | 9/1970 | Bushnell |
| 3,847,672 A | | 11/1974 | Trocciola et al. |
| 4,532,192 A | * | 7/1985 | Baker et al. ................... 429/19 |
| 5,039,579 A | | 8/1991 | Kinoshita |
| 5,068,159 A | | 11/1991 | Kinoshita |
| 5,079,103 A | * | 1/1992 | Schramm ..................... 429/17 |
| 5,232,793 A | | 8/1993 | Miyauchi et al. |
| 5,413,878 A | | 5/1995 | Williams et al. |
| 5,866,090 A | | 2/1999 | Nakagawa et al. |
| 6,103,143 A | | 8/2000 | Sircar et al. |
| 6,245,127 B1 | | 6/2001 | Kane et al. |
| 6,331,366 B1 | * | 12/2001 | Van Dine et al. ............. 429/17 |
| 6,387,845 B1 | | 5/2002 | Masahiro et al. |
| 6,458,478 B1 | * | 10/2002 | Wang et al. ................... 429/17 |
| 6,627,338 B1 | * | 9/2003 | St-Pierre et al. .......... 429/19 X |
| 2002/0142208 A1 | | 10/2002 | Keefer et al. |

FOREIGN PATENT DOCUMENTS

| | | | |
|---|---|---|---|
| JP | 63-166157 | * | 7/1988 |
| WO | WO 99/46032 | | 9/1999 |

OTHER PUBLICATIONS

QuestAir—Technology—Conventional PSA http://www.questairinc.com/technology/conventional_psa.htm, pp. 1-2, date unknown.

QuestAir—Technology—QuestAir PSA Technology http://www.questairinc.com/technology/psa_technology.htm, p. 1, date unknown.

* cited by examiner

*Primary Examiner*—Stephen J. Kalafut
(74) *Attorney, Agent, or Firm*—Cowan, Liebowitz & Latman, P.C.

(57) ABSTRACT

A fuel cell system having a fuel cell with an anode compartment and a cathode compartment. The fuel cell system is also provided with a partial-pressure pressure swing adsorption assembly operating at low pressure which uses supply gas for the cathode compartment of the fuel cell to separate carbon dioxide from the anode exhaust gas exiting from the anode compartment of the fuel cell. The partial-pressure pressure swing adsorption assembly is adapted to carry out this separation based on the difference in partial pressures of the carbon dioxide in the anode exhaust gas and the oxidant gas in the supply gas. The fuel cell system utilizes a further unit to recycle the exhaust gas, after separation of the carbon dioxide, to the anode compartment and to feed the supply gas with the carbon dioxide to the cathode compartment.

9 Claims, 2 Drawing Sheets

FUEL CELL SYSTEM WITH RECYCLE OF ANODE EXHAUST GAS

BACKGROUND OF THE INVENTION

This invention relates to fuel cell systems and, in particular, to fuel cell systems which employ anode gas recycling.

In conventional fuel cell systems and, in particular, molten carbonate fuel cell systems, reactant fuel and oxidizing gas are delivered to each of the fuel cells of the system. The fuel is passed through the anode compartment of each fuel cell, while oxidizing gas is passed through the cathode compartment.

As is known, not all of the fuel delivered to the anode compartment of a fuel cell is converted into electrical power. Typically, in a molten carbonate fuel cell, approximately 10 to 50% of the fuel exits the cell as anode exhaust gas. As a result, in order to increase the fuel cell efficiency, it is a conventional practice to recycle a portion or all of the anode exhaust gas back to the input of the anode compartment. Various procedures for recycling the anode exhaust gas have been developed.

In one type of arrangement, the fuel exhaust gas, which contains fuel (usually unreacted hydrogen and carbon monoxide), water vapor and carbon dioxide is processed to separate these constituents. The separated unreacted fuel is then recycled to the anode compartment of the fuel cell, as is a portion of the water which results as a byproduct from fuel consumption. The separated carbon dioxide, on the other hand, may be likewise recycled, in this case to the cathode compartment of the fuel cell. Carbon dioxide recycle is required for molten carbonate type fuel cells. With other fuel cell types, carbon dioxide may be transferred to the cathode exhaust gas, rather than the cathode air supply, and vented. These recycling operations improve efficiency, as above-stated, and enhance fuel cell operation.

A fuel cell system using the above-described recycling is disclosed in commonly assigned U.S. Pat. Nos. 4,532,192. In the system of the '192 patent, a hydrogen transfer device, such as an electrochemical cell, is used to separate the unreacted hydrogen from the anode exhaust gas. A condenser then removes the water. A portion of the removed water is passed through a heat exchanger whose output is recycled to the fuel cell anode compartment along with the separated unreacted hydrogen. The exhaust gas stream remaining after removing the water is then passed to a burner for burning any hydrogen with the oxidant supply gas to produce a resultant oxidant gas stream rich in carbon dioxide. This stream is then passed into the cathode compartment of the fuel cell.

U.S. Pat. Nos. 5,068,159, and 4,039,579 teach another system of this type. In this system, a cooler and condenser are first used to separate water from the anode exhaust stream. The resultant water is then passed through a boiler and a heater and fed to the inlet of the anode compartment. The anode exhaust stream, absent the water, is then processed to remove the carbon dioxide. The resultant stream is then recycled to the anode compartment of the fuel cell, while the removed carbon dioxide is recycled to the cathode compartment of the fuel cell.

The carbon dioxide separator used in the '159 and the '579 patents comprises an absorber, where the carbon dioxide is absorbed by an aqueous amine solution in an absorption column. The resultant solution is then fed to a regeneration column in which the carbon dioxide gas is stripped with air supplied from an air feed duct. The air, now rich in carbon dioxide, is then fed to the cathode compartment of the fuel cell.

As can be appreciated, the systems of the above patents require the use of complex and costly equipment for realizing their recycling and separation operations. In the '192 patent, a fuel cell type hydrogen transfer device is used, as well as heat exchangers and a burner to provide the desired recycling operations.

In the '159 and '579 patents, on the other hand, condensers, a boiler, a heater and a liquid gas separator are used to recycle hydrogen, water and carbon dioxide. The gas separator, moreover, is subject to foaming or carryover of liquid resulting from the to pumping of the liquid absorbent within the system. Moreover, such a system would require compression of the gas and/or heating of the absorbing liquid to be practical. Compressing and/or heating consume significant energy, making this option relatively unattractive. The separator also requires the use of two columns and air in order to absorb and then regenerate the carbon dioxide.

In addition to the above types of systems, other types of so-called "pressure swing adsorption systems" have been used to process a composite hydrogen gas from a natural gas reformer to separate the hydrogen from other gases. In a standard pressure swing adsorption ("PSA") system the composite gas is typically fed to the PSA system at pressures of more than 100 psia. The gases other than hydrogen (e.g. carbon dioxide and water) are adsorbed by the adsorbent bed media at high pressures and a pure hydrogen stream exits the PSA system at a pressure close to the inlet pressure. After the adsorbent bed media in the PSA system reaches its maximum adsorbent capacity, it must be purged to remove the adsorbed gases. This occurs by de-sorption which is accomplished by lowering the pressure to near atmospheric pressure of about 20 psia.

Another conventional pressure swing adsorption apparatus is a vacuum pressure swing adsorption ("VPSA") system, which operates at atmospheric pressures. In VPSA systems, de-sorption is carried out by lowering the pressure to create pressure vacuum conditions.

The conventional PSA systems require a significant amount of power to operate. A standard PSA system typically consumes 15 to 35% of the recycle fuel value as compression power in order to compress the gas to 100 to 300 psia. Because of the higher value of power energy relative to fuel, this is a substantial penalty. A conventional VPSA system requires a similar amount of power in order to generate vacuum conditions to de-sorb the adsorbent beds.

It is therefore an object of the present invention to provide a fuel cell system having an improved anode exhaust gas recycle assembly.

It is a further object of the present invention to provide a fuel cell system having an anode exhaust gas recycle assembly which is less complex and costly and is more energy efficient.

SUMMARY OF THE INVENTION

In accordance with the principles of the invention, the above and other objectives are realized in a fuel cell system comprising a fuel cell including an anode compartment and a cathode compartment. The fuel cell system further comprises a partial-pressure pressure swing adsorption assembly which operates at low pressure and uses supply gas for the cathode compartment of the fuel cell to separate carbon dioxide from the anode exhaust gas exiting from the anode compartment of the fuel cell. The partial-pressure pressure swing adsorption assembly provides this separation based on the difference in partial pressures of the carbon dioxide in the anode exhaust gas and the oxidant gas in the supply gas. The adsorption step is similar to a VPSA system adsorption, but the desorption step uses air being sent to the fuel cell to obtain a "carbon dioxide partial pressure" vacuum. The fuel cell system is also provided with further systems which, after separation of the carbon dioxide, recycle the fuel rich exhaust gas to the anode compartment and which feed the supply gas with the carbon dioxide to the cathode compartment.

In a further aspect of the invention, the system also includes a water transfer assembly which separates water from the anode exhaust gas. The further unit in this case recycles the anode exhaust gas and the water to the anode compartment after separation of both the carbon dioxide and the water from the gas. While water could also be transferred by cooling and condensing the water, physically separating it from the vapor, and vaporizing the water in the fuel stream, this method requires more equipment and consumes heat.

In one embodiment of the invention to be disclosed hereinafter, the partial-pressure pressure swing adsorption carbon dioxide transfer assembly and the water transfer assembly are wheel transfer devices. Additionally, in the disclosed system, the water transfer assembly is upstream of the partial-pressure pressure swing adsorption carbon dioxide transfer assembly to avoid transferring the water with carbon dioxide to the air rather than the fuel going to the anode.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
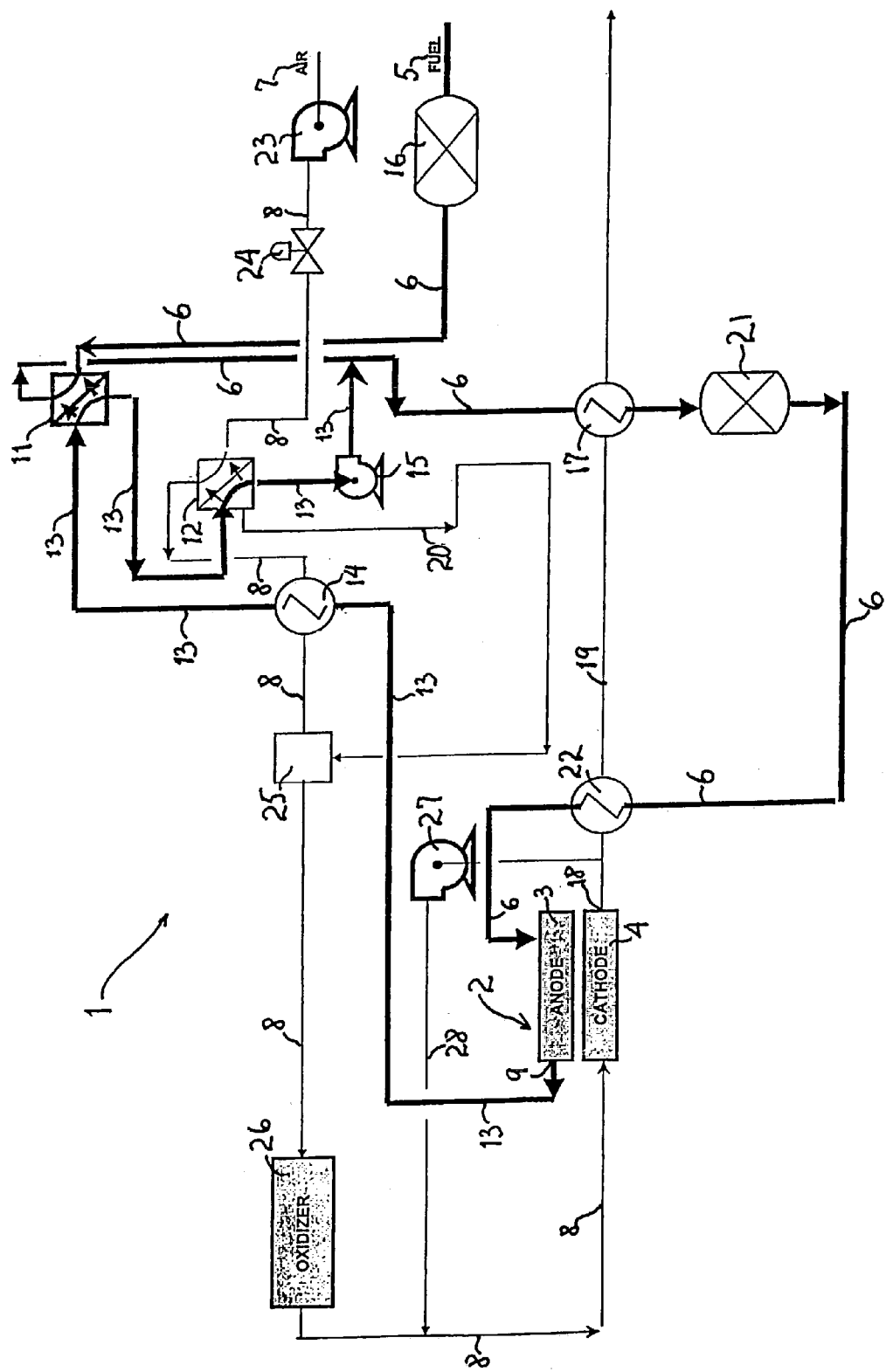
FIG. 1 shows a fuel cell system with an anode exhaust gas recycle assembly in accordance with the principles of the present invention.

FIG. 1 shows a fuel cell system 1 in accordance with the principles of the present invention. As shown, the system 1 comprises a fuel cell 2 having anode and cathode compartments 3 and 4. A carbon and hydrogen containing fuel 5 is provided to a supply line 6 which carries the fuel to the anode compartment 3 of the fuel cell 2. An oxidant supply gas 7, shown as air, is likewise conveyed by a supply line 8 to the cathode compartment 4 of the cell 2.

In accordance with the principles of the present invention, the system 1 is adapted to process the anode exhaust gas 9 from the anode compartment 3 of the fuel cell 2 so as to recycle various constituents of the gas. More particularly, the anode exhaust gas 9 comprises unreacted hydrogen and carbon monoxide, water vapor and carbon dioxide and trace amounts of other gases and the system 1 is adapted to recycle the hydrogen, carbon monoxide, water and carbon dioxide in such a way as to improve the efficiency and enhance the performance of the fuel cell 2.

Specifically, the fuel cell system 1 is provided with a water transfer assembly 11 and a carbon dioxide transfer assembly 12 which separate the water vapor and the carbon dioxide in the anode exhaust gas 9. The assembly 11 is adapted to separate and transfer the water vapor in the anode exhaust as water to the fuel 5 in line 6, while the assembly 12 is adapted to transfer the carbon dioxide in the anode exhaust gas to the oxidant supply gas 7 in the line 8, both using low pressures, adsorption and partial pressures of the gases.

In the case shown, the water transfer assembly 11 is in the form of a partial-pressure pressure swing water transfer wheel. The wheel is adapted to include a water absorbing medium which operates at or above the dew point of the anode exhaust gas. In this situation, as shown in FIG. 1, the fuel supply acts as a regenerator for the absorbing medium in the assembly 11. More particularly, the water absorbed by the absorbing medium in the assembly 11 is transferred to the fuel as the fuel passes through the wheel due to the lower partial pressure of the water in the fuel.

Also, in the case shown, the carbon dioxide transfer assembly 12 is in the form of a partial-pressure pressure swing carbon dioxide adsorption transfer wheel. The wheel includes a carbon dioxide adsorbing medium and, as illustrated, the oxidant supply gas 7 in the line 8 acts as regenerator of the adsorbing medium.

More particularly, carbon dioxide present in the fuel and entering the partial-pressure pressure swing adsorption transfer wheel 12, is adsorbed at near atmospheric pressure of about 20 psia by the carbon dioxide adsorbing medium. Carbon dioxide is then removed from the adsorbent medium by generating a carbon dioxide partial pressure vacuum, which is accomplished by passing the oxidant supply gas, or air, over the adsorbent, causing carbon dioxide to be transferred out of the adsorbent medium into the oxidant supply gas 7. Unlike the conventional pressure swing adsorption units, a partial-pressure pressure swing adsorption transfer wheel 12 requires only 1 to 3% of the recycle fuel value of parasitic power consumption for its operation and is thus more efficient and less costly than conventional systems.

Looking now at the path of the anode exhaust gas 9 in the line 13, the gas first passes through an indirect heat exchanger 14 where it is cooled by the oxidant supply gas in the line 8. The exhaust gas then passes through the partial-pressure pressure swing water transfer assembly 11. In the assembly 11, water vapor, as above-described, the water required for the operation of the fuel cell is removed from the exhaust, and the exhaust stream is then carried by the line 13 through the partial-pressure pressure swing carbon dioxide adsorption assembly 12. At this assembly, carbon dioxide is removed from the exhaust, and the exhaust, which now contains primarily unreacted hydrogen gas, is moved or recycled from the assembly 12 by the blower 15 in the line 13 to the line 6 carrying the fuel 5.

The fuel 5 receives the unreacted hydrogen after having passed through the bed 16, where any impurities in the feed, especially sulfur compound, are removed, and through the water transfer assembly 11, where, as above-described, it receives water transferred from the anode exhaust. After receiving the hydrogen from blower 15, the fuel is passed through the heat exchanger unit 17, where the water, fuel, and hydrogen are heated by the cathode exhaust gas 18 in the line 19. The fuel then passes through the de-oxidizer/reformer bed 21, where any impurities missed by purification bed 16, especially oxygen and heavy hydrocarbons are converted to carbon dioxide, water, and/or methane. From the de-oxidizer/reformer bed 21, the fuel passes through the super heater 22, where it is again heated by the cathode exhaust gas, and then passes into the anode compartment 3 of the fuel cell 2.

Looking now at the oxidant supply gas 7, it is pulled by the blower 23 through the line 8, passes through the control valve 24 to and through the partial-pressure pressure swing carbon dioxide adsorption assembly 12. In passing through the latter, as above-described, carbon dioxide gas is transferred from the anode exhaust gas to the oxidant supply gas. The oxidant supply gas is then conveyed by the line 8 through the heat exchanger 14 where it is heated by the anode exhaust gas and then carried to the mixing unit 25. The unit 25 receives a slip stream containing a small portion of the anode exhaust gas via the line 20 coupled to the transfer assembly 12. This slip stream is mixed with the oxidant supply gas and the resultant stream fed to an oxidizer 26. This slip stream can be the result of leaks between the streams 13 and 8 in transfer assembly 12 or may be controlled to prevent any significant build-up of inserts, especially nitrogen, in the fuel system. It can also be used to help control the temperature of the air to the fuel cell. The oxidizer 26 converts any fuel from the slip stream 20 mixed with the oxidant in mixer 25 to water and carbon dioxide. The oxidizer 26 output, after receiving recycled cathode exhaust gas via the blower 27 and line 28, is applied to the input of the cathode compartment.

With the system 1 of the invention configured as above-described, the separation of carbon dioxide from the anode exhaust gas is accomplished at low pressures using partial pressures and without the need of a liquid transfer medium. Additionally, with the use of a water transfer operation upstream of the carbon dioxide operation, the carbon dioxide separation and transfer can take place without the concern of transferring water to the oxidant supply gas. The water transfer operation, in conjunction with the partial-pressure pressure swing carbon dioxide transfer operation, thus results in an increased efficiency of the fuel cell 2 with less complexity.

Because the water transfer operation occurs at a higher temperature where the water is transferred in vapor phase, the need for a significant amount of heat exchange equipment required to condense and revaporize the water is reduced. Moreover, the transfer of water in vapor phase avoids the potential corrosion and fouling problems associated with the transfer of water in liquid phase.

Figure 2:
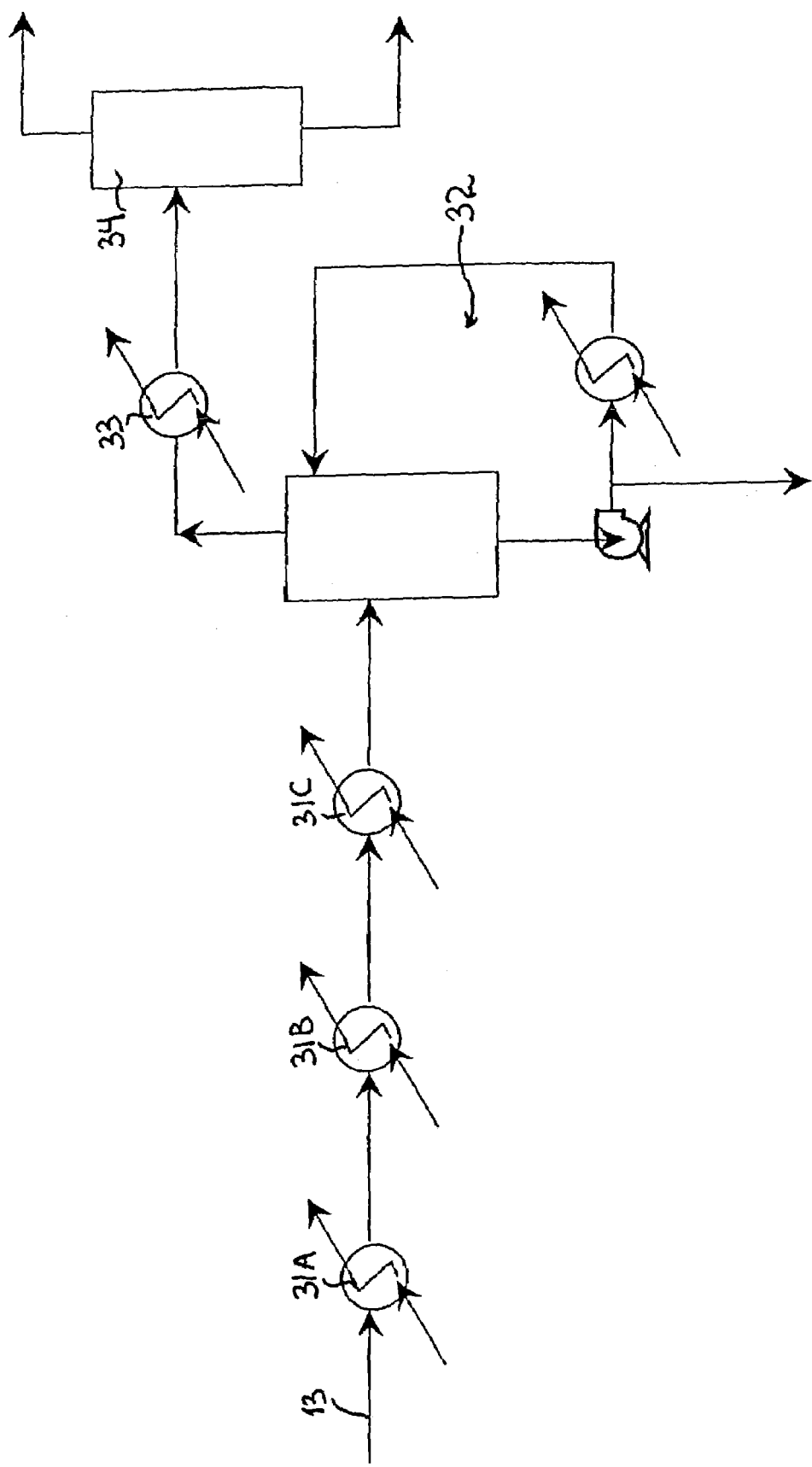
FIG. 2 shows an alternative embodiment of the water transfer assembly used in the fuel cell system of FIG. 1

While the water transfer assembly 11 has been above-described as a wheel transfer assembly, alternative transfer assemblies can also be employed. One such alternative is shown in FIG. 2. In the assembly of FIG. 2, the anode exhaust in line 13 is fed to one or more heat exchangers 31A, 31B, 31C, where it is cooled by the oxidant supply gas, water recycle vaporization and/or cooling water or an air fan. After being cooled, the stream is fed to a scrubbing and blow-down assembly 32 where electrolyte contaminated water is removed. The resultant stream is then further cooled in a heat exchanger 33 by an air fan or cooling water and the stream then fed to a condensing unit 34. At the unit 34, the water is removed and fed to the fuel supply line 6 and the remaining stream is then coupled to the line 13 leading to the transfer assembly 12.

It should be noted that the carbon dioxide transfer assembly 12 and water transfer assembly 11 of the invention can be configured as a customized form of the gas purification system manufactured by QuestAir Technologies, Inc. Also, a modified pressure swing adsorption system where the partial pressures are used as described above, rather than total pressures typically used may be used for the carbon dioxide transfer assembly 12 and water transfer assembly 11 of the invention. Such systems are manufactured by UOP and Air Products.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell system comprising:
    a fuel cell including an anode compartment and a cathode compartment;
    a partial-pressure pressure swing adsorption assembly operating at low pressure of about 20 psia or less using oxidant supply gas for said cathode compartment to separate carbon dioxide from said anode exhaust gas, said partial-pressure pressure swing adsorption assembly providing said separation based on the difference in partial pressures of the carbon dioxide in said anode exhaust gas and the oxidant gas in said oxidant supply gas;
    a unit recycling said anode exhaust gas, after separation of said carbon dioxide, to said anode compartment of said fuel cell and feeding said oxidant supply gas with said carbon dioxide to said cathode compartment of said fuel cell.

2. A fuel cell system according to claim 1, further comprising:
    a water transfer assembly separating water from anode exhaust gas exiting from said anode compartment.

3. A fuel cell system according to claim 2, wherein:
    said water transfer assembly is upstream of said partial-pressure pressure swing adsorption assembly.

4. A fuel cell system according to claim 3, wherein:
    said water transfer assembly comprises a partial-pressure pressure swing water transfer wheel; and
    said partial-pressure pressure swing adsorption assembly comprises a carbon dioxide transfer wheel.

5. A fuel cell system according to claim 2, wherein said water transfer assembly comprises a water absorbing media.

6. A fuel cell system according to claim 5, wherein said water absorbing media operates at or above the dew point of the anode exhaust gas.

7. A fuel cell system according to claim 2, wherein said water transfer assembly comprises a condenser.

8. A fuel cell system according to claim 7, wherein said water transfer assembly further comprises a scrubbing unit and a blowdown unit for removal of water contaminated with electrolyte.

9. A fuel cell system comprising:
    a fuel cell including an anode compartment and a cathode compartment;
    a partial-pressure pressure swing adsorption assembly which operates at low pressures of about 20 psia or less and has an adsorption medium, said partial-pressure pressure swing adsorption assembly, in an adsorbing step, adsorbing in said adsorption medium carbon dioxide from the anode exhaust gas of said fuel cell and, in a medium regeneration step, using the oxidant supply gas for said cathode compartment to remove said carbon dioxide from said adsorption medium by flowing said oxidant supply gas across said adsorption medium and thereby creating low partial pressures of the carbon dioxide in said adsorption medium; and
    a unit recycling said anode exhaust gas, after separation of said carbon dioxide, to said anode compartment of said fuel cell and feeding said oxidant supply gas with said carbon dioxide to said cathode compartment of said fuel cell.

* * * * *